United States Patent [19]

Peterson et al.

[11] 4,160,357

[45] Jul. 10, 1979

[54] CATCHING SURFACE SEAL AND ROTATING TRUNK FOR A CONTINUOUS TREE CHOP HARVESTER

[75] Inventors: Donald L. Peterson, East Lansing, Mich.; Gordon E. Monroe, Warmer Robins, Ga.

[73] Assignee: The United States of America as represented by the Secretary of Agriculture, Washington, D.C.

[21] Appl. No.: 882,003

[22] Filed: Feb. 28, 1978

[51] Int. Cl.² .............................................. A01D 46/24
[52] U.S. Cl. .................................................... 56/329
[58] Field of Search ............... 56/329, 328 R, 328 TS, 56/330

[56] References Cited

U.S. PATENT DOCUMENTS

| | | | |
|---|---|---|---|
| 2,436,648 | 2/1948 | Isom | 56/329 |
| 3,420,045 | 1/1969 | Holzmann | 56/330 |
| 3,514,936 | 6/1970 | Grover | 56/330 |
| 3,553,949 | 1/1971 | Rauth | 56/329 |

*Primary Examiner*—Jay N. Eskovitz
*Attorney, Agent, or Firm*—M. Howard Silverstein; David G. McConnell; Salvador J. Cangemi

[57] ABSTRACT

A continuous tree crop harvester is fitted with right and left catching surfaces. The right half catching surface is designed to move back and forth over the left half catching surface. At the same time and without interrupting the forward motion of the harvester, a rotating trunk seal is provided to enclose and seal the trunk of the tree to be harvested. Thus sealing of the catching surface and tree trunk is reversed after harvesting and the harvester is moved to the next crop harvesting position.

8 Claims, 6 Drawing Figures

4,160,357

CATCHING SURFACE SEAL AND ROTATING TRUNK FOR A CONTINUOUS TREE CHOP HARVESTER

FIELD OF THE INVENTION

This invention relates to an apparatus for the continuous harvesting of tree crops. More specifically, this invention relates to the use of catching surface seals in combination with a rotating trunk seal for a continuous tree crop harvester.

DESCRIPTION OF THE PRIOR ART

There are no catching surface seals presently existing for continuous moving tree crop harvesters whose two catching surface halves (one on either side of the tree row) are not physically connected together. One existing design shows straddle row grape and blueberry harvesters that use "fishscales", overlaping spring loaded panels, to seal between the catching surfaces and also allow posts, stems and bushes to pass continuously through the harvesters. These "fishscales" are cantilevered from both halves of the catching surfaces and are only effective if both halves of the harvester are physically joined together so that they are always directly across from one another, a constant distance apart, and at the same height above the ground.

Of the many known experimental sealing mechanisms, none have been found effective except the one disclosed herein as the invention. All other known seals leave too big an opening around the tree trunk to provide effective sealing.

Some commercial stop-go harvesters use a flexible member with a slit in it to accomodate the tree trunk and provide a seal in that manner. However, this flexible member is often bent in such a way as to become a barrier to fruit movement. The seals on stop-go harvesters are not transferrable to continuous moving harvesters.

SUMMARY AND OBJECTS OF THE INVENTION

A right catching surface is slidably mounted to the support frame of one half of a continuous harvester. A means of allowing this right catching surface to move forward and backward with respect to the forward movement of the harvester is provided. Simultaneously, another means is provided for the right catching surface to move back and forth to overlap the left catching surface half of the continuous harvester. Thus sealing of the two halves of the harvester is accomplished without interrupting the forward motion of the continuous harvester.

It is the primary object of the instant invention to provide seals for a continuously moving tree crop harvester.

It is another object of the invention to provide a seal for the two halves of a continuous moving tree crop harvester.

It is another object of the invention to provide an effective seal around the tree trunk of the individual trees being harvested.

Other objects of the invention will become obvious from the detailed description of the preferred embodiments of the invention.

This invention distinguishes over the prior art in that the seals herein described as the invention is unique in that they provide a seal between two continuously moving catching surfaces that are not physically joined together and still allows for movement of trees between the two catching surfaces. This seal could also be used on over the row harvesters. The invention also contains a unique rotating notched disk that provides an effective low profile seal in the area around the tree trunk. This rotating notched disk could also provide an effective seal on stop-go harvesters. This rotating disk minimizes the open areas that fruit can be lost to the ground and eliminates the flexible flaps of conventional truck seals that impair free fruit movement.

DESCRIPTION OF THE PREFERRED EMBODIMENTS

Figure 1:
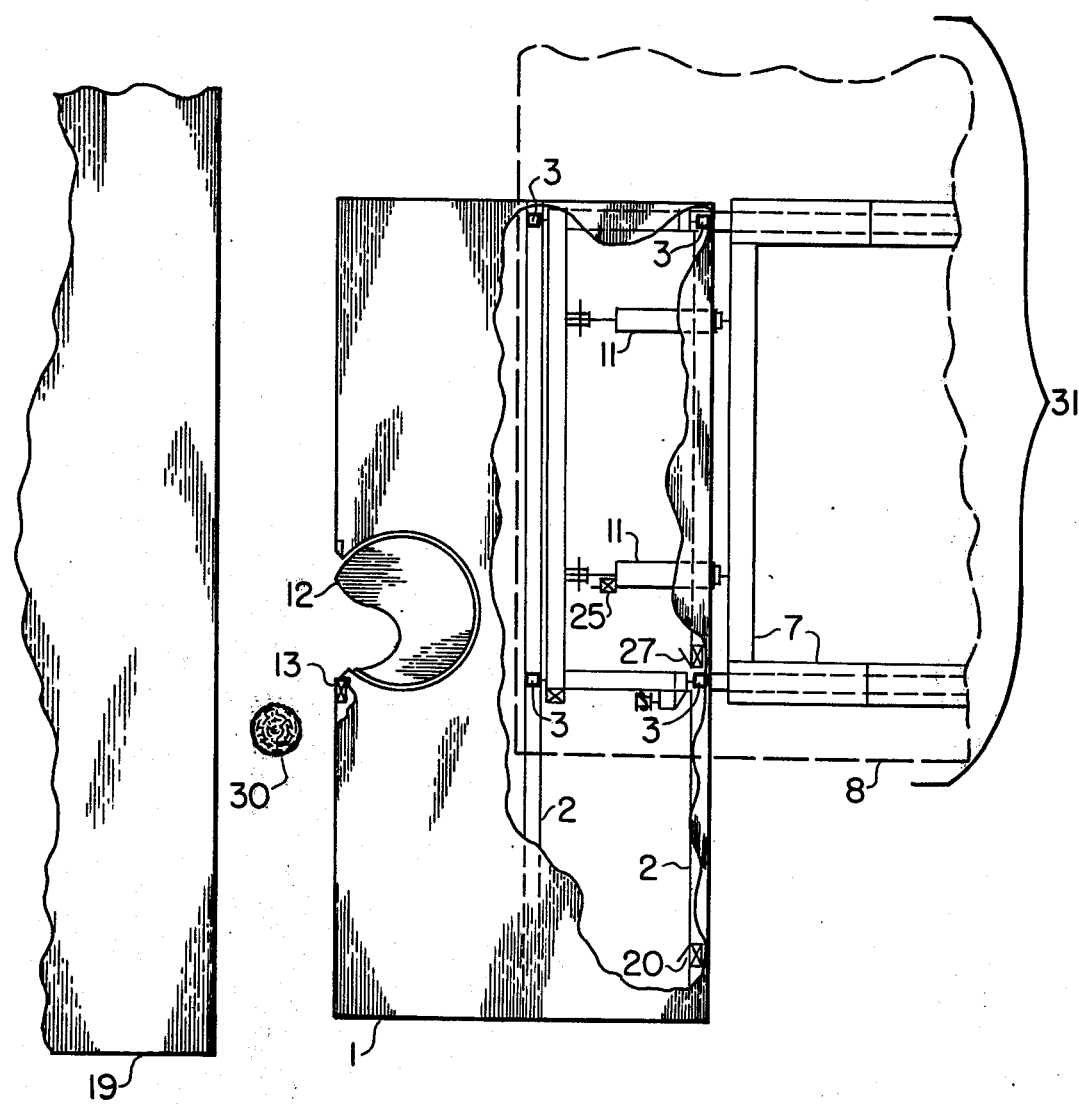
FIG. 1 is a top view of the catching surface seal and the trunk seal.
Figure 2:
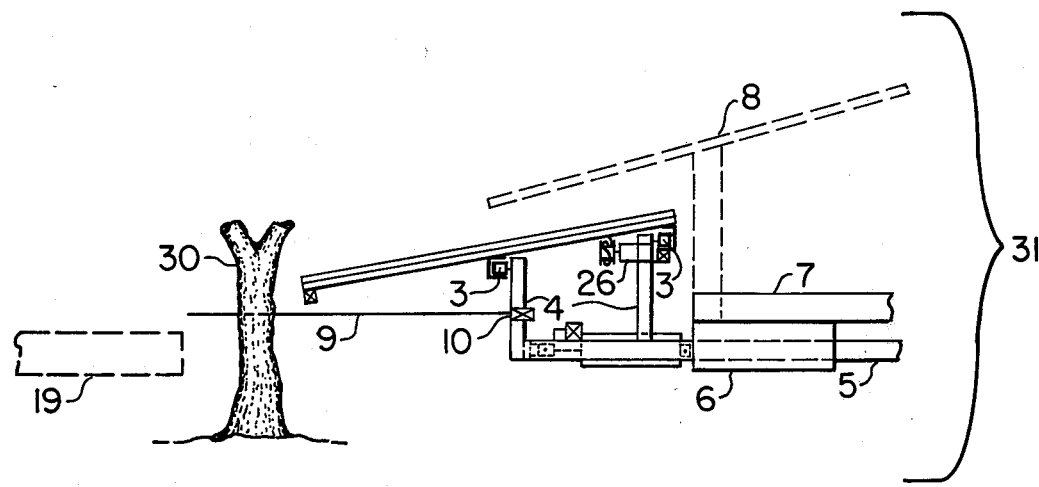
FIG. 2 is a front view of the catching surface seal.
Figure 3:
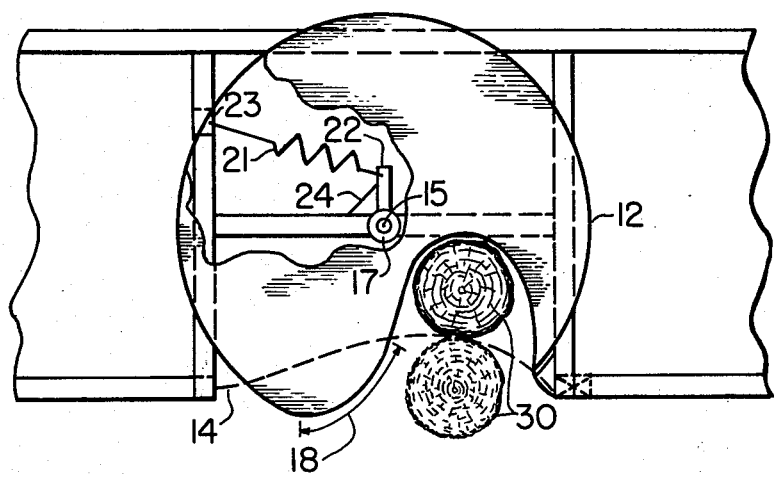
FIG. 3 is a top view of the trunk seal showing initial position before closing.
Figure 4:
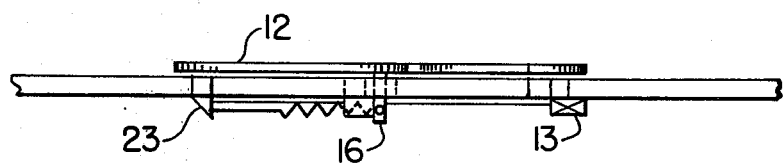
FIG. 4 is a front view of the trunk seal showing its initial position.
Figure 5:
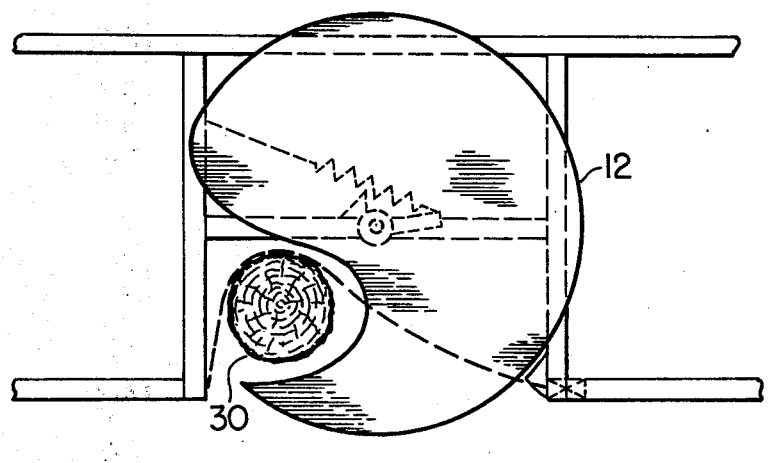
FIG. 5 is a top view of the trunk seal showing closed position.

Referring now to FIG. 1 wherein the right catching surface seal 1 is supported by and affixed to a track system composed of two parallel channel tracks 2 which are located on the underside surface of right catching surface seal 1. The track system 2 is a means of allowing right catching surface seal 1 to slide backward and forward in relation to the forward motion of a continuous harvester 31. Channel track system 2 is supported by and free to slide on four bearings 3. Bearings 3 are supported by four vertical columns 4 (FIG. 2) which are rigidly connected to two horizontal members 5. These two horizontal members 5 are supported by and capable of sliding through two support housings 6. Support housings 6 are rigidly fastened to the main frame 7 of the harvester's right half 31. Also attached to main frame 7 is the main catching surface 8 of the harvester 31. As harvester 31 approaches a tree 30, a stiff triggering rod 9 strikes tree trunk 30 and triggers first micro switch 10. First micro switch 10 activates a solenoid controlled-hydraulic control valve (not shown). Through this solenoid controlled-hydraulic control valve (not shown) hydraulic cylinders 11 (FIG. 1) are energized to move the catching surface seal 1 out and trunk seal 12 along with it out and around trunk 30 in such a manner that trunk seal 12 surrounds trunk 30. The ground speed of the harvester 31, the location of rod 9 and speed of the hydraulic cylinders 11 are synchronized so that the trunk 30 of the tree will be positioned in the offset notch in the periphery of the rotating disk 12, position A (FIG. 3). A second micro switch 13 is triggered by a cable 14 as tree trunk 30 strikes cable 14 to deenergize the solenoid controlled hydraulic valve (not shown) and stop actuating fluid to cylinders 11. A delay in this process allows seal 12 to surround trunk 30 as in position B. This delay is due to the time lag after shutting off second micro switch 13 and the actual closing of solenoid controlled-hydraulic control valve (not shown). Therefore, this time lag is compensated for by the proper adjustment of the position of second micro switch 13. This adjustment in the instant invention was made emperically by adjusting micro switch 13 into position in relation to the speed of the hydraulic cylinders 11. Then due to the forward movement on seal 1 with respect to tree trunk 30, rotating seal 12, which is a disk like design with an off-centered peripheral notch, pivots around pivot point 15 thus completing seal position C (FIG. 5). It should be noted that the offset notch in the periphery of the disk is designed with sufficient size to accomodate the largest diameter tree trunk to be harvested. It should also be noted that pivot point 15 is essentially in the center of rotating disk 12. Disk 12 is supported by a vertical shaft 16 (FIG. 4) and rotates in bearing 17 (FIG. 3). Due to the manner in which curved surface 18 of disk 12 strikes tree trunk 30, the desired completed seal position C will be achieved even if the initial feed-in of tree trunk 30 is to the left of the notch in disk 12. At point C seal 12 is complete and seal 1 overlaps left catching surface 19 (FIG. 2). Keeping in mind that harvester 31 is moving continuously, seal 1 stays in position around tree 30 by having bearings 3 pulled through and along seal 1's channel tracks 2. The position of seal 1 and 12 is not affected by movement perpendicular to tree 30 of harvester 31 since hydraulic cylinders 11 are in a free floating mode when seal 12 is in C position. This floating mode for the cylinders at this point of operation is necessary to provide flexibility for the machine. Otherwise if the harvester 31 was driven towards or away from tree 30 the equipment would be too rigid and would result in damage.

The instant invention is operated normally by setting the withdrawal of seals 1 and 12 away from tree 30 by a timer mechanism (not shown). This can be any time necessary for harvesting the crop at each tree. Therefore, either after a pre-set time or when third micro switch 20 (FIG. 1) is triggered by contact with the right front support column 4 (FIG. 2) hydraulic cylinders 11 are activated to pull seal 1 away from tree 30, and consequencly seal 12 also. As seal 1 is retracted from trunk 30, seal 12 is returned to initial open position A by return spring 21 (FIG. 2) which is attached to shaft 16 by post 22 and to the seal's frame 23. Positive stop block 24 limits the length of the return movement of seal 12. Retraction of seal 1 and 12 (FIGS. 1 and 2) is stopped when switch 25 (FIG. 1) on cylinder 11 is switched. Seal 1 is then pulled forward to its initial position by a hydraulic motor and cable-drum device 26 (FIG. 2). Cable 32 is attached to the seal's framework and cable-drum 26. This hydraulic motor 26 free wheels to unwind cable 32 when seal 1 is in position around tree 30 and the main harvester 31 is moving forward. Switch 27 (FIG. 1) is triggered when contact is made with right front support column 4 to deactivate device 26 to complete the cycle. Both switch 20 and 27 are rigidly connected to left channel track 2. It should be noted that all fruit contact surfaces are covered by a foam material to minimize fruit injury.

Figure 6:
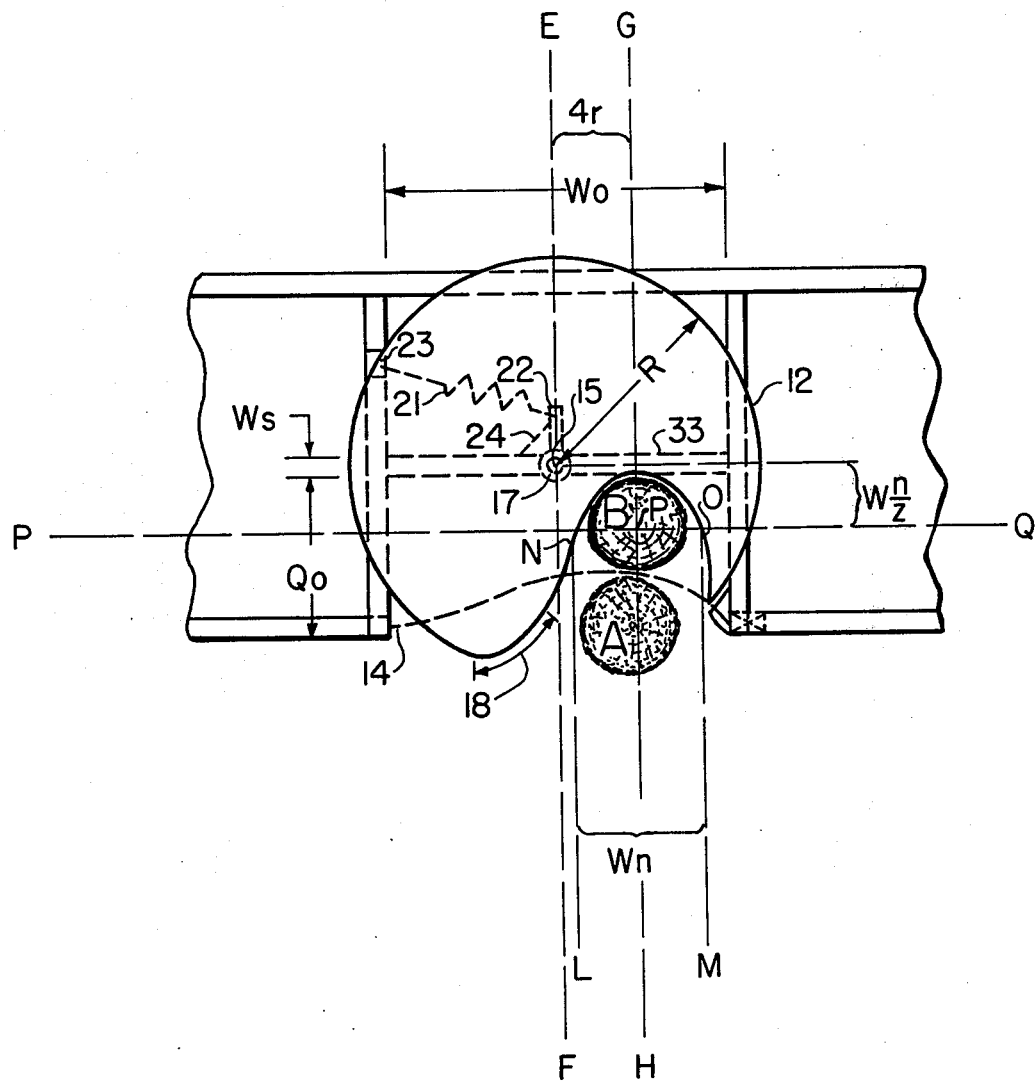
FIG. 6 is a top view showing the dimensional means of constructing a trunk seal for different size tree trunks.

Turning now to FIG. 6 wherin dimensions for the design of the trunk seal or disk 12 can be determined in the harvesting of different sizes of trees as follows:

Looking down on top view FIG. 6, line EF bisects center point 15. Parallel line GH bisects the center of the notch. Parallel lines LN and MO define the outer limits of the inside of the notch edges. Line JK will also pass thru point 15 and be perpendicular to line EF.

In general the following definitions will apply in designing the optimum size seal to the tree to be harvested: Let R be the radius of the disk 12. The width of the opening, $W_o$, that the disk 12 covers is equal to 1.8 R ($W_o = 1.8$ R), and the depth, $D_o$, is just $W_o/2$ ($D_o = W_o/2$). $D_t$ is the diameter of the largest trunk to be harvested. $W_n$ is the width of the notch, and equal to $D_t/2$. The bottom part of the notch is an arc whose radius is $W_n/2$. The center of the circle R which will determine this arc will be found on the line HG and is a distance of 0.45 R from line EF. This center point R is also a distance of ($W_n/2 + W_s/2$) from the line JK. $W_s$ is the width of the center support beam 33.

We claim:

1. An apparatus for sealing the catching surface of a continuous tree crop harvester comprising in combination:
    (a) a right catching surface;
    (b) a track system comprising two parallel channel tracks affixed to one side of said right catching surface;
    (c) a support means for said track system consisting essentially of four bearings which allow the track system to freely slide over said bearings, and said support means also allowing said track system to freely slide over said support means;
    (d) four vertical columns affixed to and supporting said support means;
    (e) two rigid horizontal members affixed to and supporting said four vertical columns;
    (f) two support housings supporting said horizontal members but with said horizontal members capable of sliding through said housing.
    (g) a main frame of one half of a continuous moving harvester rigidly fastened to said support housings;
    (h) a left catching surface to be overlapped by said right catching surface;
    (i) hydraulic cylinders which when energized move the right catching surface over and away from the left catching surface;
    (j) a first micro-switch to activate said hydraulic cylinders.

2. The apparatus of claim 1 including a triggering rod to activate said first micro-switch.

3. The apparatus of claim 2 including the following:
    (a) a cable;
    (b) a second micro-switch triggered by said cable, said micro-switch deenergizing said hydraulic cylinders into a stop position.

4. The apparatus is defined in claim 3 wherein the second micro-switch is positioned to compensate for a time lag between the shutting off of the second-micro switch, and the actual closing of the hydraulic cylinders.

5. The apparatus of claim 4 including a means of returning the right catching surface back to its original position said returning means comprising in combination:
    (a) a third micro switch to activate the hydraulic cylinders into a reverse action and pulling the right catching surface back into the original position.

6. The apparatus of claim 5 including a means of sealing a trunk, said sealing means comprising in combination:
    (a) a rotating disk with an offset notch in the periphery thereof, said notch designed with sufficient size to accomodate the circumference of a tree trunk;
    (b) a pivoting means for said rotating disk to pivot thereon, said pivoting means located and affixed essentially to the center of said rotating disk;
    (c) a vertical shaft for supporting said disk;
    (d) a means of rotating said disk into a closed position.

7. The apparatus of claim 6 including means for rotating said seal into an open position.

8. The apparatus of claim 7 wherein the means of rotating the seal into an open position comprises in combination:

(a) a return spring attached to the vertical support shaft of the disk;
(b) a positive stop to limit the length of return of said block.

* * * * *

UNITED STATES PATENT AND TRADEMARK OFFICE
CERTIFICATE OF CORRECTION

PATENT NO. : 4,160,357

DATED : July 10, 1979

INVENTOR(S) : Donald L. Peterson and Gordon E. Monroe

It is certified that error appears in the above-identified patent and that said Letters Patent are hereby corrected as shown below:

[75] Inventors: Donald L. Peterson, East Lansing, Mich.; Gordon E. Monroe, Warner Robins, Ga.

Column 4, line 4, cancel "$D_t/2$" and insert -- $D_t$ --.

In Figure 3, on upper component 30, insert -- B --.

In Figure 3, on lower component 30, insert -- A --.

In Figure 5, on component 30, insert -- C --.

In Figure 6, on right end of line passing through point 15 and perpendicular to line EF, insert -- K --.

In Figure 6, on left end of line passing through point 15 and perpendicular to line EF, insert -- J --.

In Figure 6, cancel "$Q_o$" and insert -- $D_o$ --.

UNITED STATES PATENT AND TRADEMARK OFFICE
CERTIFICATE OF CORRECTION

PATENT NO. : 4,160,357
DATED : July 10, 1979
INVENTOR(S) : Donald L. Peterson and Gordon E. Monroe It is certified that error appears in the above-identified patent and that said Letters Patent are hereby corrected as shown below:

The title in the above captioned patent should read as follows:

[54] CATCHING SURFACE SEAL AND ROTATING TRUNK SEAL

FOR A CONTINUOUS TREE CROP HARVESTER

Signed and Sealed this

Twenty-second Day of January 1980

[SEAL]

Attest:

Attesting Officer

SIDNEY A. DIAMOND

Commissioner of Patents and Trademarks